United States Patent [19]
Gibson

[11] Patent Number: 5,014,795
[45] Date of Patent: May 14, 1991

[54] PERCENT GRADE BORING AND MONITORING APPARATUS

[75] Inventor: Paul N. Gibson, Saluda, S.C.

[73] Assignee: Augers Unlimited, Inc., Ashland, Ohio

[21] Appl. No.: 345,907

[22] Filed: May 1, 1989

[51] Int. Cl.⁵ .................. E21B 7/06; E21B 47/024
[52] U.S. Cl. .................................. 175/45; 33/366; 175/61; 175/62; 175/73
[58] Field of Search ............. 175/45, 62, 73, 61, 175/320; 33/366, 313

[56] References Cited

U.S. PATENT DOCUMENTS

| | | | |
|---|---|---|---|
| 4,042,046 | 8/1977 | Capoccia | 175/45 X |
| 4,438,820 | 3/1984 | Gibson | 175/45 |
| 4,779,353 | 10/1988 | Lopes et al. | 33/366 |

FOREIGN PATENT DOCUMENTS

| | | | |
|---|---|---|---|
| 190832 | 8/1986 | European Pat. Off. | 33/366 |
| 2847128 | 5/1980 | Fed. Rep. of Germany | 33/366 |
| 43714 | 2/1989 | Japan | 33/366 |
| 8810408 | 12/1988 | PCT Int'l Appl. | 33/366 |
| 1150352 | 4/1985 | U.S.S.R. | 175/45 |
| 1240830 | 7/1971 | United Kingdom | 175/45 |
| 2110374 | 6/1983 | United Kingdom | 33/366 |

*Primary Examiner*—Hoang C. Dang
*Attorney, Agent, or Firm*—Cort Flint

[57] ABSTRACT

An earth boring tool for forming a bore underground at a desired percent of grade and a grade sensor (A) for sensing percent of grade as the bore is formed are disclosed. The earth boring tool includes a pipe casing (10) and cutting head (12). Sensor (A) includes dielectric fluid chambers (30b, 32b) formed by chamber plates (30, 32) and a sandwiched capacitor plate (34). Capacitors (34a, 34b) are contacted by the dielectric fluid in the chambers. A differential capacitance signal is produced as a fluid level (80) variably covers and uncovers capacitors (34a, 34b) to produce a varying differential output signal. The differential output signal is converted into a linearly changing percent grade signal (64) by a conversion circuit (44a). The percent of grade signal is displayed on a monitor (C) by which an operator may steer the casing to a desired grade.

25 Claims, 3 Drawing Sheets

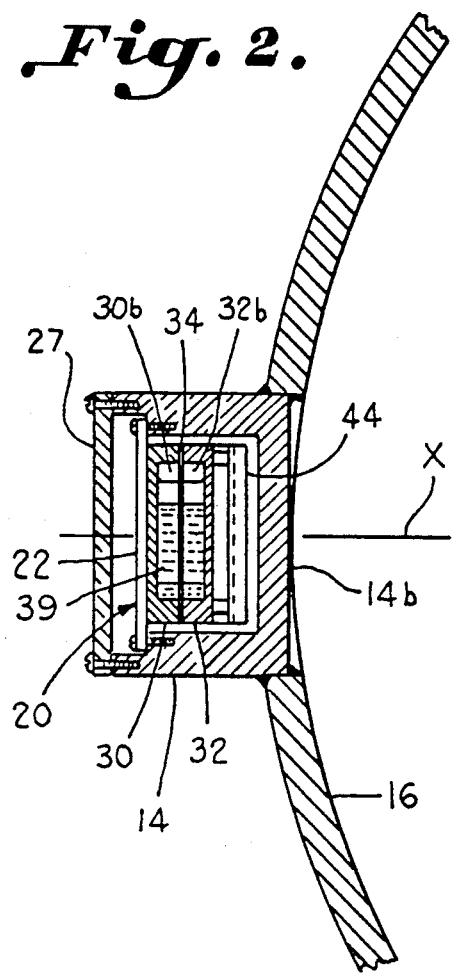
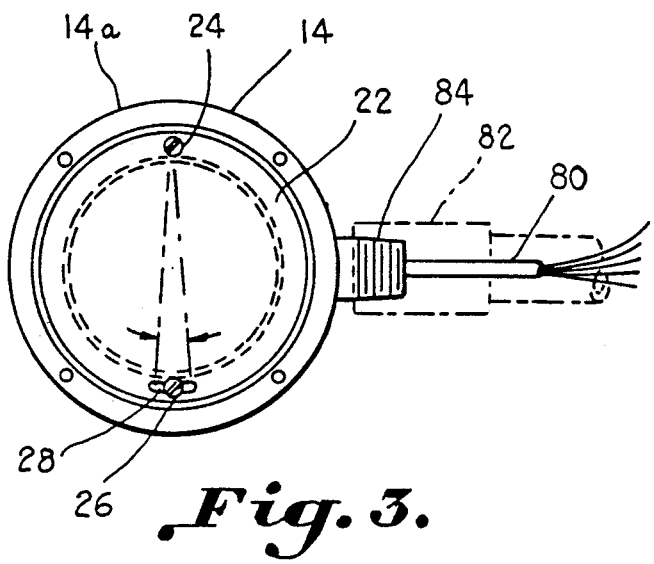
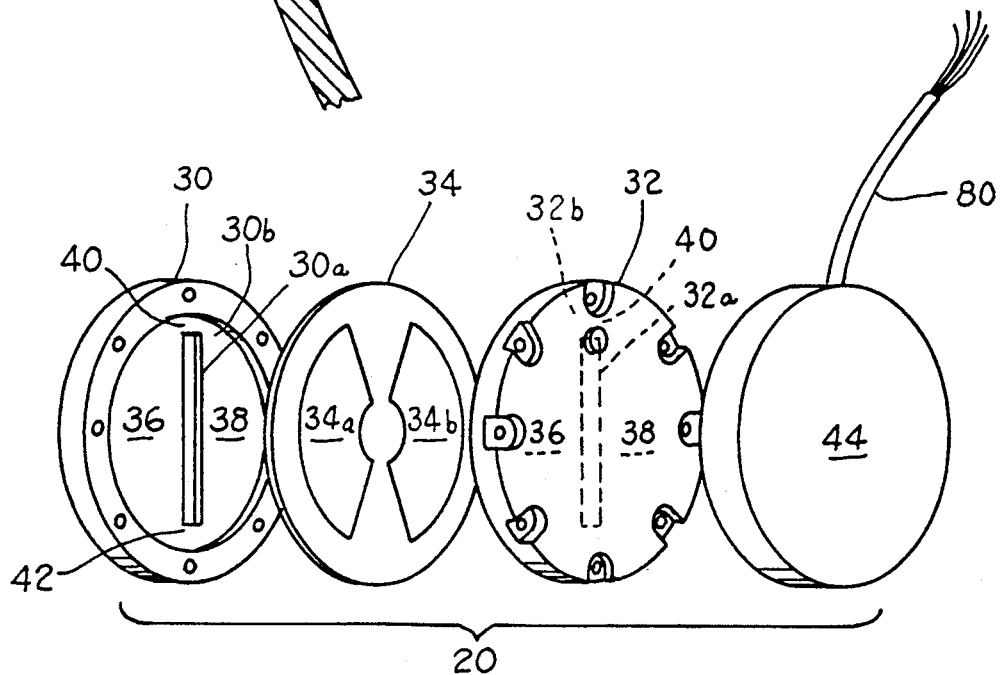

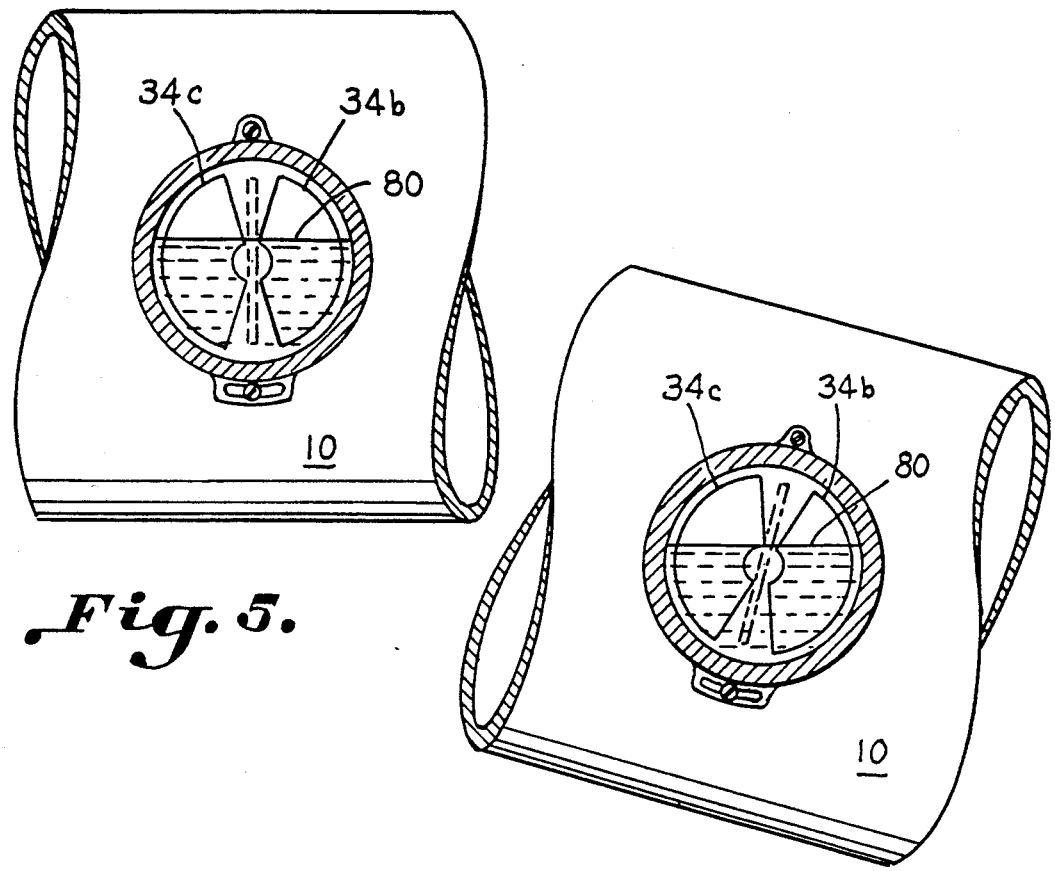
Fig. 5.
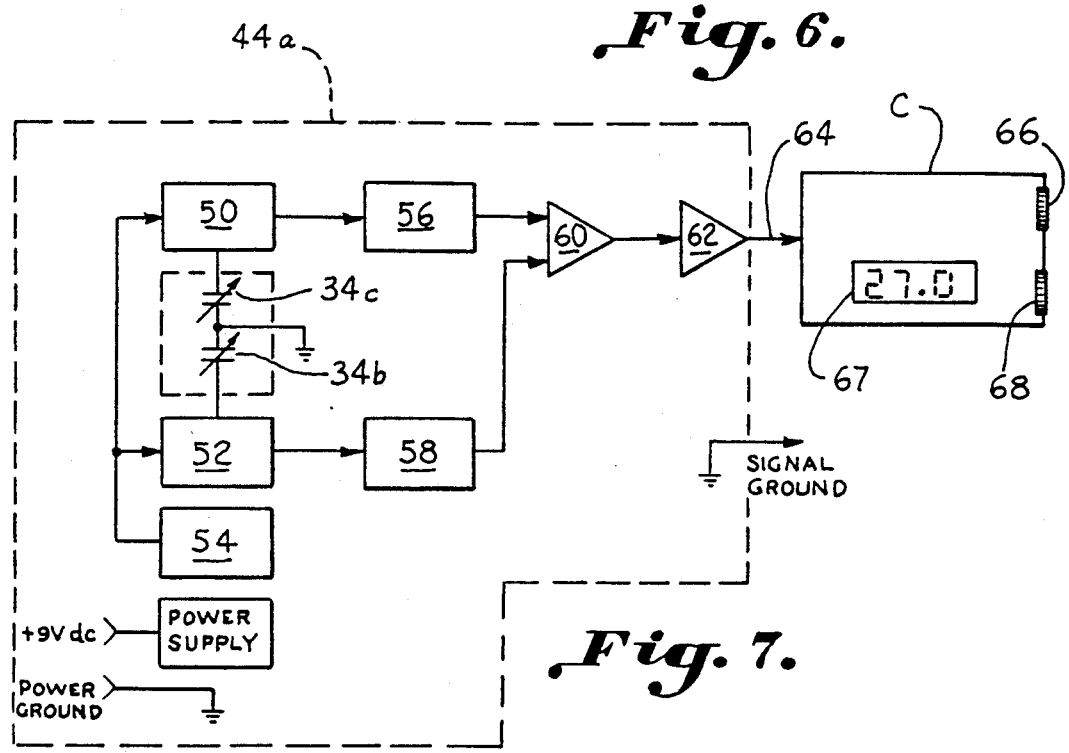
Fig. 6.
Fig. 7.

PERCENT GRADE BORING AND MONITORING APPARATUS

BACKGROUND OF THE INVENTION

In the laying of pipe underground such as in the laying of sewer lines, it is necessary to bore and lay the pipe casing underground at a desired percent of grade. It thus becomes necessary to monitor and control the grade of the casing as the bore is cut and the casing is simultaneously pushed through the underground bore to maintain the desired percent of grade. However, the bore and casing cannot be seen as it is formed through extended links underground and the problem of monitoring and maintaining the desired percent of grade is a problem to which considerable attention must be given in order to avoid re-boring.

Heretofore, remote hydraulic grade indicators have been utilized, such as shown in U.S. Pat. No. 3,851,716, which include a sight tube on an indicator board at a boring station connected to a water line which is affixed to the top of the casing being bored and pushed through the ground. Any deviation in the leading edge of the casing from the desired grade either up or down provides a corresponding response to the water level in the sight tube located in the boring pit. Based on the reading of the sight tube, the operator in the boring pit may pivot the head of the casing which carries a cutting head by means of a mechanical linkage. However, the problem arises that the water line connected to the sight tube must be vented on both ends and if the apparatus is utilized below the water table, water can enter the tube and interfere with the reading at the sight tube. The apparatus also has inherent vibration problems which necessitate that the apparatus be shut down to take a reading of the sight tube. The sight tube cannot be monitored simultaneously with the boring operation. With the vibrations, air locks are often create which interfere with the accuracy of the reading in the sight tube. The above inaccuracies can result in the final line being off grade often requiring re-boring. The range of this apparatus is also limited since it reaches its practical limits owing to the mechanical nature of the system. Due to the pivotable connection of the casing head utilized to steer the casing up and down, there is an open space between the casing head and the casing pipe being laid. This space creates a problem if the apparatus is utilized in soft or sandy soil whereby the soil feeds in through the space resulting in cavein.

Applicant is the inventor of U.S. Pat. No. 4,438,820 disclosing an improved percent grade sensor which includes a light emitting diode and a linear light sensor photopotentiometer arranged in a reservoir filled with a predetermined level of oil. Any changes in the percent grade of the casing head of the boring tool creates a change in the inclination of the oil level in the reservoir. In response, the light transmitted and the intensity of light received by the photopotentiometer is changed. The resulting voltage signal is converted to a digital or decimal readout of percent grade deviation which is used to steer the casing head back to a desired percent grade. While the sensor performs well, it is costly and is highly susceptible to inaccuracies caused by deviation of the casing head and sensor in a roll direction. It has been found that if four or five degrees of roll are exceeded, the reliability of the sensor is effected.

There is a considerable need for an earth boring system and percent grade sensor which is insensitive to vibration, loss of accuracy due to wear of mechanical parts, low end unit cost price, and insensitive to roll movements.

All plan grades are given in percent of grade, for example, point A to point B at 0.5 percent of grade, results in a straight grade from point A to point B with a desired slope. Percent of grade is continuous slope. The use of a water level such as disclosed in U.S. Pat. No. 3,324,564 monitors differences in elevation from the starting point to the distance of the leading edge of the bore at any time. This has to be converted into a rate of fall or slope which is practically impossible to do and maintain a highly accurate grade. The water level system is highly susceptible to vibration and requires this continuance of boring operations every few feet to allow the system to settle down for the taking of readings. While this time of slope could have deviated by as much as 4-5%. While there are many sensors which read in degrees of angular position, this is undesirable for boring applications. For example, an electronic clinometer manufactured by Schaevitz Sensing Systems, Inc. of Phoenix, Arizona under the trademark ACCU-STAR which senses angular displacement in terms of degrees. The device has been used in many robotic, aircraft, automotive, railroad, and manufacturing applications to measure angular degrees. The device includes two ground plates which sandwich a capacitor plate. Liquid and an inert gas is sealed between the capacitor plates in each half of the housing. When rotated, the sensor provides a linear variation in capacitance which may be electronically converted into degrees of angular position. However, the device does not have an output for percent of grade readings. The output of the sensor is typically a sinusoidal function which is converted into angular degrees.

Accordingly, an important object of the present invention is to provide a percent grade monitor for accurately monitoring the grade of pipe casing being bored and pushed underground which is reliable and inexpensive.

Still another important object of the present invention is to provide a grade monitor for monitoring the grade of associate mechanical equipment and machinery which is highly accurate and not susceptible to vibrations, or roll movement.

Still another important object of the present invention is to provide grade monitoring and boring apparatus which accurately senses deviations in the percent of grade of casing being bored and laid and changes the direction of the cutting head accordingly in a highly responsive manner.

SUMMARY OF THE INVENTION

The above objectives are accomplished according to the present invention by the use of a sensor device which includes a sensor housing attached at a 90 degree position within a side wall of the casing of a boring tool. A sensor unit is fixed within the sensor housing which includes two chambers with a common capacitor plate sandwiched between the chambers. The two chambers form electrical ground plates equal distance from the capacitor plate. The chambers are filled with a dielectric fluid and inert gas. The capacitor plate includes two separate capacitors which provide an output which can be converted to a percent of grade. The output is processed by an electrical circuit and displayed as a percent of grade reading. As the boring tool progresses through the bore, any deviations in percent of grade will be reflected in rotation of the sensor about its sensing axis and displacement of the liquid and gas with respect to the capacitor plates to vary the capacitance output. The variation in capacitance will be displayed as a change in percent of grade. The chambers between the chamber plates and capacitor plate are very thin and placement of the sensor in the side wall of the casing makes it virtually unaffected by large variations in roll. The system is not effected by vibration and continuously reads in percent of grade, not elevation, thereby requiring no calculations or halting of boring operations. Any deviations in digital readout will result in displaying 0.001 foot of deviation from the desired plane at this point, or predicting the bore will be off 0.01 foot in the next 10 feet or 0.1 of a foot in the next 100 feet. The system is not effected by static pressure since the sensor may be coated with RTV to prevent moisture from entering the connector. The system can be used in below freezing temperatures or from anywhere between −35 degrees to +150 degrees Fahrenheit. The sensor unit provides highly accurate sensing and monitoring of a percent grade of the bore as the boring tool progresses, not elevation or angular position in degrees.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 2 is a sectional view taken along line 2—2 of FIG. 1;

FIG. 3 is a front elevation of a percent grade sensor constructed in accordance with the present invention for use with a boring tool;

FIG. 4 is a respective view of a percent grade sensor according to the present invention with parts separated;

FIG. 5 is an elevation illustrating a percent grade sensor and casing head constructed in accordance with the present invention in a desired percent grade condition;

FIG. 6 is an elevation illustrating a percent grade sensor and boring casing illustrating the apparatus in a deviated percent grade condition; and FIG. 7 is a schematic circuit diagram illustrating an electrical circuit for converting the signal from a sensor device to analog signals in accordance with the present invention for a decimal readout of percent grade deviation.

DESCRIPTION OF A PREFERRED EMBODIMENT

Figure 1:
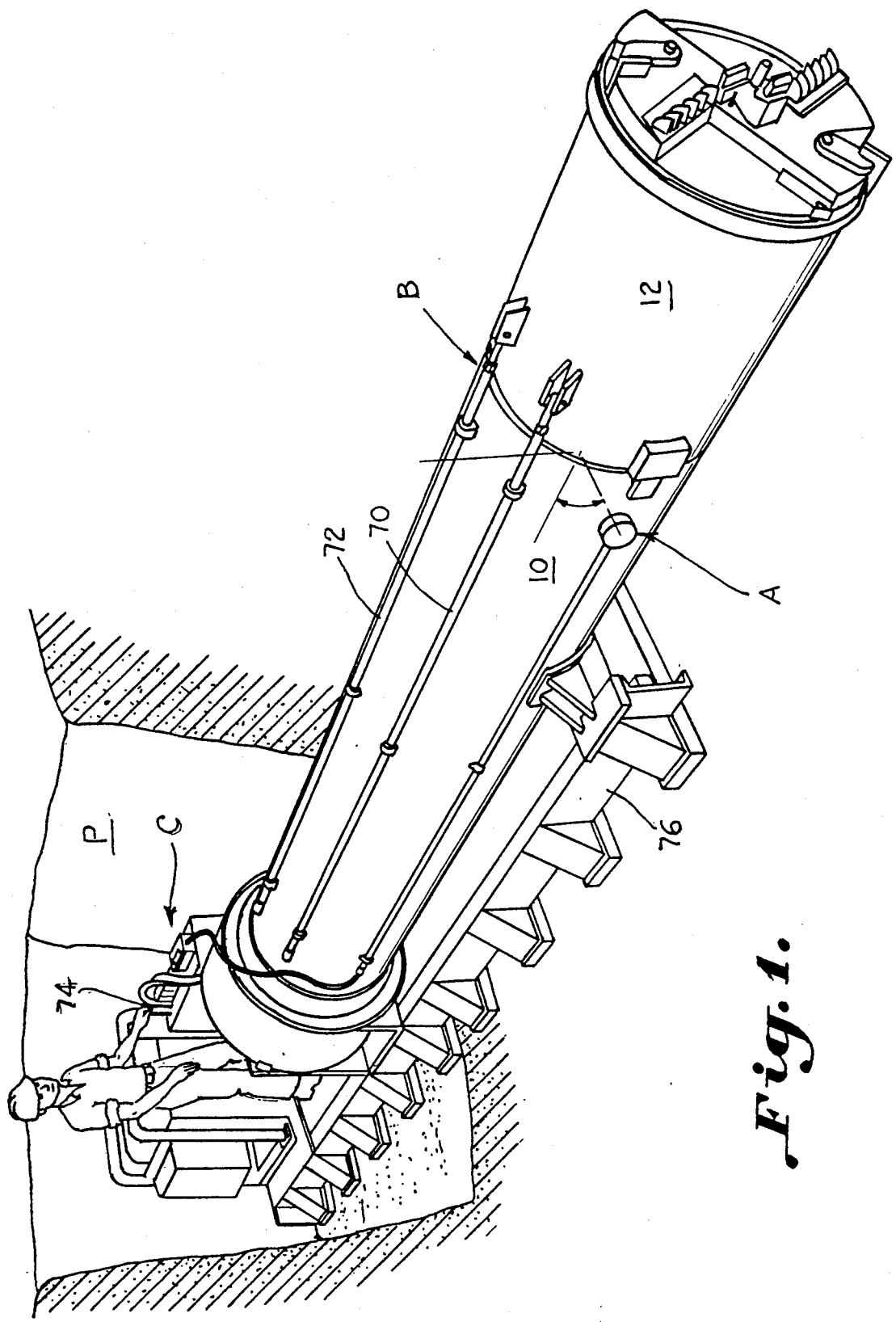
FIG. 1 is a perspective view illustrating a percent grade boring and monitoring apparatus constructed in accordance with the present invention.

The invention relates to an apparatus for monitoring and controlling the percent of grade of associated earth working machinery and particularly to earth boring apparatus for boring and laying pipe casing underground. Such a boring operation normally commences from a boring pit station P and is of the type which includes means for forming a bore and pushing the pipe casing through the bore as it is formed. For purposes of this application, the terms slope and grade are used interchangeably.

The boring apparatus includes a casing head carried adjacent the front end of the pipe casing. A percent grade sensor means A is carried by the casing head for sensing the grade of the casing head being pushed through the bore. Steering means B is carried by the casing head for moving the casing head to produce a reactionary steering force. A monitor C allows an operator to read the percent grade deviation to steer the casing head to within tolerance of the percent grade.

Referring now in more detail to the drawings, grade sensor means A is illustrated according to the invention as attached to a stationary section 10 of the boring tool directly behind moveable casing head 12. Sensor A includes a sensor housing 14 which is affixed to casing section 10 by cutting out a hole in a side wall of the casing and welding a base sensor housing portion 14a into the opening so that a back 14b is generally flush with the inside circumference of the inside wall 16 of the casing. An improved percent grade sensor designated generally as 20 is fitting within sensor housing 14 and includes a sensor cover 22. Grade means 20 is secured to sensor housing 14 by means of set screws 24 and 26. Set screw 26 is received in a slotted opening 28 of cover 22 so that sensor 20 may be rotated slightly in the housing for calibration. Thereafter, the set screw 26 may be set. A housing cover 27 then is attached to housing 14.

Referring now in more detail to the drawings, grade sensor means 20, as can best be seen in FIG. 4, is illustrated in the form of a variable or differential capacitance sensor which includes chamber means defined by two cast zinc chamber plates 30 and 32 with a common capacitor plate 34 sandwiched between to define first and second chambers 30b and 32b. Sensor plate 30 and sensor plate 32 form electrical ground plates equal distant from common capacitor plate 34 that isolates them. Capacitor plate 34 is a copper plated plastic disc which has been chemically etched to create variable capacitor means in the form of two, independent capacitors 34a and 34b. A partition 30a and a partition 32a, in respective chambers 30b and 32b of the chamber plates 30 and 32, electrically isolate the capacitors. This forms two chamber halfs 36 and 38 in each chamber 30b and 32b. Each chamber half 36, 38 is filled with equal amounts, by volume, of a dielectric liquid 39 and an inert gas. Slots 40 and 42 at the top and bottom of the partitions permit equalization of the fluid level and gas pressure between the chamber halfs. When sensor unit 20 is rotated about its sensitive axis "X", the liquid and gas from the chamber halfs move with respect to the two common capacitor plates 34a and 34b. The liquid has a greater dielectric constant than the gas, so if one plate is submerged more than the other, it will have a higher capacitor. Because of the constant radius and circular shape, equal amounts of the capacitor plates would be covered and uncovered by the fluid as the sensor rotates. This assures a linear change in capacitor ratio and thus an output signal.

Sensor unit 20 includes a circuit housing 44 which contains electronic circuitry 44a, as illustrated schematically in FIG. 6, to translate the sensors differential capacity into a percent grade output signal. One particularly suitable sensor is manufactured by Schaevitz Sensing Systems, Inc. of Phoenix, Arizona, as described in the background of the present invention. This sensor can be modified in its output and converted to output percent grade instead of angular degrees.

Referring to FIG. 6, operation of the electronic circuitry for the sensor will be described. Variation in the capacitance from plates 34a and 34b are output to a one-shot timer at 50 and a one-shot timer at 52. These may be conventional one-shot timer circuits. The one-shot pulse widths are supplied as outputs. The one-shot timers are pulsed repeatedly by an astable time 54 which may be any conventional timer. The output of each one-shot timer has approximately a 50% duty cycle when the sensor is in a level or zero position. As the sensor is rotated clockwise, the corresponding one-shot timer increases its pulse width and duty cycle, while the opposite effect occurs with the other one-shot timer. Filter circuits 56 and 58 integrate the one-shot pulses into DC voltages. A differential amplifier 60 derives the difference voltage. The sign of the difference voltage denotes the direction of sensor rotation and the amplitude denotes the amount. The design of the capacitance plates yields linearity to within 1 percent of reading throughout the prescribed range. The narrow configuration of the fluid chambers 30b and 32b virtually eliminates errors due to cross-axis inclination. This enhances the sensor's use in dual axis pitch/roll mode of operation. The output of differential amplifier 60 goes to a buffer amplifier 62 which produces an analog output 64. The gain of amplifier 62 may be provided to convert the differential output signal into a percent of grade signal. Output 64 is delivered to monitor C which displays the percent of grade, and/or deviation of percent of grade. An adjustment knob 66 allows the sensor to be zero and a switch 68 is for cutting the monitor on and off.

Any suitable conventional means may be utilized to steer the boring tool such as that disclosed in U.S. Pat. No. 4,438,820 or 3,939,926. Hydraulic actuators as shown in the '926 patent are illustrated at 70 and 72 which are controlled by a hydraulic control system 74 to raise or lower the movable casing head 12. The casing is originally set up on track 76 at the desired percent of grade. If not already installed, a hole is cut in the side of casing section 10 and sensor housing 14 is fitted in the hole and welded in place, as can best be seen in FIG. 2. Housing 14 is preferably arranged in the side of casing 10 so that the sensor axis X is positioned to extend perpendicularly or at 90 degrees to a vertical axis intersecting the longitudinal axis of casing 10. The sensor housing placement can be over a 45 degree range, for example, 65 to 110 degrees from this vertical axis, however, 90 degrees preferred. Next, sensor unit 22 is installed. Instrument cable 80 is connected to a pigtail relay connected to electronic housing 44 in the remote end of instrument cable 80 and is routed through a pipe 82. Pipe 82 is screwed onto a threaded coupling 84 which forms part of housing 14. The remote end of the instrument cable is attached to monitor C. With the sensor A installed, sensor unit 20 may be rotated slightly to zero out the reading on the monitor. Set screw 26 may then be set in place. Alternately, the reading may be zeroed out by knobs 66 on the monitor device. Both the capabilities are had so that enough range will exist when the device is used on extreme grades such as over 20%. The sensor unit reads plus or minus 20% of grade in 0.1 of 1%. For example, a reading of 0.1 represents 1/10 of a foot fall or slope per 100 feet. Reading of 1.0 represents 1 foot fall or slope per 100 feet, etc. The power for sensor unit A is a 9 volt battery which lasts approximately 1000 hours. The boring tool may then begin its operation in the conventional manner. As additional sections of casing 10 are added to the boring tool, additional sections of pipe 82 may also be added. Instrument cable 80 is provided in a sufficient length and may be coiled up at the monitor to accommodate the length of bore from being formed.

As can best be seen in FIG. 5, the level 80 of liquid is fairly level as the boring is started. As the boring tool proceeds along track 76, should there be a deviation, the change will be reflected on the display 67 of monitor C. For example, as can best be seen in FIG. 6, should casing 10 tilt down from the orientation of the track, the amount which liquid 80 covers capacitor plates 34a and 34b will change resulting in a corresponding capacitance signal change in circuit 44a. The differential capacitance signal indicating the difference in capacitors 34a and 34b is transformed into an output at display 67 indicating the change in percent of grade. The casing may then be steered back to grade by the operator.

While a preferred embodiment of the invention has been described using specific terms, such description is for illustrative purposes only, and it is to be understood that changes and variations may be made without departing from the spirit or scope of the following claims.

What is claimed is:

1. A combination of a boring tool for forming a bore underground at a desired percent of grade and a grade sensor for sensing said percent of grade as said bore is formed, said boring tool having a pipe casing, a casing head carried adjacent to said pipe casing having a cutting head which cuts said bore, means for steering said casing head up or down to correct the grade of said bore, and means for pushing said pipe casing through the bore as it is formed, said grade sensor comprising:

a sensor housing carried by a side wall of said casing;

variable capacitor sensor means carried by said sensor housing for sensing motion about a sensing axis in a pitch direction corresponding to changes in percent of grade, and generating variable capacitance signals in response to said motion about said sensing axis said sensing axis is arranged to extend between 65 and 110 degrees of a vertical axis intersecting the longitudinal axis of said casing; and means for converting said variable capacitance signals into grade signals representing deviations in percent of grade to correct for deviations of said casing in grade as said bore is formed;

whereby said steering means may be controlled to return said casing to said desired percent of grade.

2. The apparatus of claim 1 wherein said variable capacitance sensor means includes:

an interior chamber means;

a capacitor plate carried in fluid communication with said chamber means which includes capacitor means; and a dielectric fluid carried within said chamber means which variably covers said capacitor means depending on rotation of said sensor means about said sensing axis to generate said variable capacitance of said capacitor means and corresponding variable capacitance signals.

3. The apparatus of claim 2 wherein said chamber means has a narrow configuration in an axial direction of said sensing axis of said sensor means about which said sensor means senses deviations in percent of grade, and said dimension of said narrow configuration renders said sensor means generally insensitive to movement in a roll direction.

4. The apparatus of claim 2 wherein said chamber means includes first and second chamber plates, and said capacitor plate is sandwiched between said first and second chamber plates defining respective first and second chambers, each said chamber containing said dielectric fluid and having said narrow configuration in said axial direction of said sensing axis effectively limiting said dielectric fluid to displacement generally about the pitch axis of said sensor means eliminating cross-axis coupling in the pitch and roll directions.

5. The apparatus of claim 2 wherein said capacitor means includes first and second capacitors, and said variable capacitance signal includes a linear differential capacitance signal representing a linear change in capacitance ratio between said first and second capacitors; and converting means for converting said differential capacitance signal into a linearly changing percent of grade signal representing the rotation of said sensor unit as said bore is formed.

6. The apparatus of claim 4 wherein said capacitor plate includes a pair of capacitors carried by said plate and each chamber plate has a partial partition carried between said capacitors defining a pair of chamber halfs in said respective chamber between which said fluid passes.

7. The apparatus of claim 1 wherein said sensor housing is mounted within an opening formed in said casing.

8. The apparatus of claim 7 wherein said base of said sensor housing is mounted in said casing flush with an inside wall of said casing.

9. The apparatus of claim 7 wherein said sensor housing includes a sensor cover which covers said sensor means within said sensor housing, said sensor means being secured to said cover, and means for rotatably mounting said cover and sensor means relative to said housing for adjusting the orientation of said sensor means relative to said housing.

10. The apparatus of claim 1 wherein said sensor housing is carried by said casing with said sensing axis extending at about 90 degrees from the vertical axis.

11. Earth boring apparatus for boring and laying pipe casing underground commencing from a boring pit station of the type which includes means for forming a bore and pushing the pipe casing through the bore as it is formed, said apparatus comprising:
a casing head carried adjacent the front of said pipe casing;
a cutting head carried by forward end of said casing head;
steering means moving said casing head relative to said pipe casing for steering said casing head through said bore during boring at a desired grade;
a grade sensor unit contained in a sensor housing carried by said casing for sensing the percent of grade at which said bore is being bored;
said grade sensor unit including a variable capacitance means having a chamber means formed in part by a capacitor plate with a capacitor means;
a dielectric fluid contained in said chamber means for variably covering said capacitor plate as said sensor rotates about a sensing axis generally in a pitch direction to cause displacement of said dielectric fluid and variance in said capacitor means;
means for generating variable capacitance signals in response to said displacement of said dielectric fluid; and
converting means for converting said variable capacitance signals into grade deviation signals indicating deviations in percent of grade of said bore so that said casing head may be steered to correct for said deviation in percent of grade and return said casing to said desired grade;
means mounting said sensor housing containing said sensor unit within an opening formed in said casing so that a base of said sensor housing is generally flush with an inside wall of said casing.

12. The apparatus of claim 11 wherein capacitor means includes first and second capacitors, and said variable capacitance signal includes a linear differential capacitance signal representing a linear change in capacitance ratio between said first and second capacitors; and said converting means for converting said differential capacitance signal into a linearly changing percent of grade signal representing the rotation of said sensor unit as said bore is formed.

13. The apparatus of claim 11 wherein said sensor housing includes a sensor cover which covers said sensor unit within said sensor housing, said sensor unit being secured to said cover, and means for rotatably mounting said cover and sensor unit relative to said housing for adjusting the orientation of said sensor unit relative to said housing.

14. The apparatus of claim 11 wherein said sensor housing includes a fitting conduit being carried by said casing connected to said fitting, and an instrument cable connected to said sensor unit passing through said conduit to a monitor having a visual readout of said percent of grade.

15. The apparatus of claim 14 including a plurality of conduits and plurality of said pipe casings joined end to end and connectable to each another, said instrument cable passing through said plurality of conduits in series.

16. The apparatus of claim 11 wherein said sensor housing is carried by said casing within a range of about 65 to 110 degrees of a vertical axis intersecting the longitudinal axis of the casing.

17. For use with apparatus for boring and laying pipe casing underground which includes means for steering said casing head up or down to determine the grade of said bore, means for pushing said pipe casing through the bore as it is formed, and a sensor for sensing the percent of grade of said casing comprising:
a grade sensor unit contained in a sensor housing mountable to said casing for sensing percent of grade;
said grade sensor unit comprising variable capacitance means having a chamber means formed in part by a capacitor plate with capacitor means;
a dielectric fluid carried in said chamber means for variably covering said capacitor means to produce a variable capacitance signal;
converting means for converting said variable capacitance signal into a grade deviation signal representing the deviation in grade from a desired percent of grade;
wherein said sensor housing is mounted within an opening formed in said casing so that a base of said sensor housing is generally flush with an inside wall of said casing;
wherein said sensor housing includes a sensor cover which covers said sensor unit within said sensor housing, said sensor unit being secured to said cover, and means for rotatably mounting said cover and sensor unit relative to said housing for adjusting the orientation of said sensor unit relative to said housing.

18. The apparatus of claim 17 wherein said chamber means includes a first chamber formed on a first side of said capacitor plate, and a second chamber formed on a second side of said capacitor plate, said dielectric fluid contained in said first and second chambers; and said first and second chamber plates forming ground plates equal distant from said capacitor plate.

19. The apparatus of claim 18 wherein said capacitor means includes a first capacitor and a second capacitor carried by said capacitor plate exposed to said dielectric fluid.

20. The apparatus of claim 19 including:

a first partition in said first chamber, and a second partition in said second chamber;

said first and second partitions electrically isolating said first and second capacitor plates in said first and second chambers to thus define a pair of chamber halfs in each of said first and second chambers;

said first and second chambers being filled with equal amounts of said dielectric fluid;

said dielectric fluid consisting of equal amounts of a dielectric liquid and an inert gas; and slots formed at the top and bottom of said partitions to permit equalization of the fluid level and gas pressure between said pair of chamber halfs in each of said first and second chambers.

21. The apparatus of claim 20 wherein said variable capacitance signal includes a linear differential capacitance signal representing a linear change in capacitance ratio between said first and second capacitors; and said converting means converts said differential capacitance signal into a linearly changing percent of grade signal representing the rotation of said sensor unit as said bore is formed.

22. The apparatus of claim 17 wherein said sensor housing includes a fitting connectable to a pipe section, the pipe section connected to said fitting carried by said casing, and an instrument cable connected to said sensor unit for passing through said pipe section to a monitor which displays said changes in percent of grade into a digital display reading.

23. The apparatus of claim 17 wherein said sensor housing is carried by said casing within a range of about 65 to 110 degrees of a vertical axis intersecting the longitudinal axis of the casing.

24. A method for controlling an earth boring tool for forming a bore underground at a desired percent of grade using a boring tool having a pipe casing, a casing head carried at a forward end of said pipe casing having a cutting head which cuts said bore, and means for steering said casing head up or down to form said bore at said desired grade, said method comprising:

mounting a grade sensor having a sensing axis onto a side portion of said casing so that said sensing axis is angularly disposed in a range of 65 to 110 degrees f a vertical axis intersecting the longitudinal axis of said casing;

sensing said percent of grade as said bore is formed by detecting the difference in capacitance between two capacitors which are carried in said sensor by using a dielectric fluid confined in a chamber in contact with said capacitors for displacement about said sensing axis of said sensor in a pitch direction so that said fluid is displaced according to the rotation of said sensor about said sensing axis to variably cover said capacitors and produce differential capacitor signals representing rotation of said fluid about said sensing axis;

converting said differential capacitance signals into a linearly changing percent of grade signals; and using said percent of grade signals to steer said casing back to desired grade.

25. A combination of a boring tool for forming a bore underground at a desired percent of grade and a grade sensor for sensing said percent of grade as said bore is formed, said boring tool having a pipe casing, a casing head carried adjacent to said pipe casing having a cutting head which cuts said bore, means for steering said casing head up or down to correct the grade of said bore, and means for pushing said pipe casing through the bore as it is formed, said grade sensor comprising:

a sensor housing carried by a side wall of said casing;

variable capacitor sensor means carried by said sensor housing for sensing motion about a sensing axis in a pitch direction corresponding to changes in percent of grade, and generating variable capacitance signals in response to said motion about said sensing axis; and means for converting said variable capacitance signals into grade signals representing deviations in percent of grade to correct for deviations of said casing in grade as said bore is formed;

whereby said steering means may be controlled to return said casing to said desired percent of grade;

wherein said variable capacitance sensor means includes:

an interior chamber means;

a capacitor plate carried in fluid communication with said chamber means which includes capacitor means; and a dielectric fluid carried within said chamber means which variably covers said capacitor means depending on rotation of said sensor means about said sensing axis to generate said variable capacitance of said capacitor means and corresponding variable capacitance signals; and wherein said chamber means includes first and second chamber plates defining respective first and second chambers, and said capacitor plate is sandwiched between said first and second chamber plates, defining respective first and second chambers, each said chamber containing said dielectric fluid and having said narrow configuration in said axial direction of said sensing axis effectively limiting said dielectric fluid to displacement generally about the pitch axis of said sensor means eliminating cross-axis coupling in the pitch and roll directions.

* * * * *